US009243132B2

(12) United States Patent
Fung et al.

(10) Patent No.: US 9,243,132 B2
(45) Date of Patent: Jan. 26, 2016

(54) HIGH-FREQUENCY COPPER FOIL COVERED SUBSTRATE AND COMPOUND MATERIAL USED THEREIN

(75) Inventors: Dein-Run Fung, Taipei (TW); Te-Chao Liao, Taipei (TW); Hao-Sheng Chen, Taipei (TW); Chun-Lai Chen, Taipei (TW)

(73) Assignee: Nan Ya Plastics Corporation (TW)

( * ) Notice: Subject to any disclaimer, the term of this patent is extended or adjusted under 35 U.S.C. 154(b) by 12 days.

(21) Appl. No.: 13/486,054

(22) Filed: Jun. 1, 2012

(65) Prior Publication Data

US 2012/0315814 A1 Dec. 13, 2012

(30) Foreign Application Priority Data

Jun. 13, 2011 (TW) .............................. 100120540 A

(51) Int. Cl.
| | |
|---|---|
| *B32B 27/04* | (2006.01) |
| *C08F 283/08* | (2006.01) |
| *C08C 19/44* | (2006.01) |
| *H05K 1/00* | (2006.01) |
| *C08L 9/00* | (2006.01) |
| C08K 3/36 | (2006.01) |
| C08K 5/00 | (2006.01) |

(52) U.S. Cl.
CPC ... *C08L 9/00* (2013.01); *C08K 3/36* (2013.01); *C08K 5/0025* (2013.01); *C08K 5/0066* (2013.01); *C08L 2207/324* (2013.01); *Y10T 428/31696* (2015.04); *Y10T 442/2475* (2015.04)

(58) Field of Classification Search
CPC ................................ B32B 215/06; C08K 3/22
See application file for complete search history.

(56) References Cited

U.S. PATENT DOCUMENTS

| 5,571,609 | A | * | 11/1996 | St. Lawrence et al. | ........ 442/234 |
| 7,713,621 | B2 | * | 5/2010 | Choate et al. | ................. 428/396 |
| 2003/0045164 | A1 | * | 3/2003 | Echigo et al. | ................. 439/577 |
| 2008/0038528 | A1 | * | 2/2008 | Paul | .............................. 428/219 |
| 2009/0266591 | A1 | * | 10/2009 | Amou et al. | .................... 174/258 |
| 2009/0280243 | A1 | * | 11/2009 | Mayer et al. | .................. 427/154 |
| 2011/0180762 | A1 | * | 7/2011 | Sasaki et al. | .................. 252/511 |
| 2012/0055789 | A1 | * | 3/2012 | Swartz et al. | ................. 204/415 |

FOREIGN PATENT DOCUMENTS

CN 101115348 A * 1/2008

OTHER PUBLICATIONS

Machine Translation of CN 101115348 A by Zuo filed on Jul. 24, 2006.*
CN 101115348 A translation by Zuo, 2006.*
Wang et al., Synthesis and Properties of Thermosetting Modified Polyphenylene Ether, 2007, Polymer Bulletin 59, pp. 391-402.*

* cited by examiner

*Primary Examiner* — Peter Y Choi
*Assistant Examiner* — Christine Rea
(74) *Attorney, Agent, or Firm* — Bacon & Thomas, PLLC

(57) ABSTRACT

A high-frequency copper claded laminate for use in an operational frequency of at least 1 GHz possesses properties of dielectric constant (Dk) less than 3.2, dissipation factor (Df) less than 0.005, high glass transition temperature, high thermal stability and low moisture absorption; the laminate contains a tack-free prepreg constituted by a reinforcement impregnated with an inventive resin mixture at least comprising a high-molecular-weight polybutadiene resin, a low-molecular-weight polybutadiene resin, a modified thermosetting polyphenylene ether resin and an inorganic powder; and particularly the tack-free prepreg can be processed into the copper claded laminates through automated layup processing to satisfy a long-felt but unmet needs in the filed of producing copper claded laminate.

10 Claims, No Drawings

HIGH-FREQUENCY COPPER FOIL COVERED SUBSTRATE AND COMPOUND MATERIAL USED THEREIN

BACKGROUND OF THE PRESENT INVENTION

1. Field of the Invention

The present invention relates to a high-frequency copper cladded laminate (or called copper foil covered substrate) and a compound material used therein, wherein the substrate has a dielectric constant (Dk) less than 3.2 and a dissipation factor (Df) less than 0.005.

2. Description of Related Art

With the rapid growth of 3C (Customer Electronics, Computer, and Communication) industries, printed circuit boards (PCBs) have been correspondingly made with a frequency limit up to 1 GHz, from materials of low dielectric constants (Dk less than 3.2) and low dissipation factors (Df less than 0.005).

Conventionally, high-frequency substrates are mainly made of polybutadiene resins through the impregnating and high-temperature vacuum laminating processes traditionally used for making printed circuit boards (PCBs). However, polybutadiene has high tack, so the prepreg made therefrom is too tacky to be put into continuous manufacture of high-frequency substrates that traditionally uses automated layup processing.

Among the publicly accessible patent documents, U.S. Pat. No. 4,241,132 has disclosed insulating boards with a dielectric constant (Dk) between 2.2 and 20, which is made by impregnating fiber reinforcement with a polybutadiene polymer carrying a filler therein, and curing the polymer. However, this patent provides no solution to the problem that polybutadiene is too tacky to allow the insulating boards to be put into continuous automated manufacture.

U.S. Pat. No. 5,223,568 has provided a moldable thermosetting composition for making circuit boards. Therein, a polybutadiene or polyisoprene resin which is a liquid at room temperature and which has a molecular weight less than 5,000 is selected to be mixed with a solid butadiene- or isoprene-containing polymer (e.g., a thermoplastic elastomer). This patented scheme requires a high temperature cure condition at a high temperature (i.e., hot-pressing temperature greater than about 250° C.), yet leaves the problem that polybutadiene is too tacky to allow continuous automated manufacture unsolved.

For dealing with the problem related to the high tack of polybutadiene, U.S. Pat. No. 6,071,836 has proposed a compound circuit board material containing particulate filler in a large amount. The prepreg made therefrom is almost tack-free, so is suitable for the traditional automated layup processing. However, since the compound material has the filler taking more than 50 wt %, or up to 70 wt %, therein, it is nevertheless unfavorable to uniform impregnation to fabric reinforcement. In addition, the resultant circuit board is excessively rigid and tends to aggravate abrasion to drilling bits that drill the board in a drilling process, thus being adverse to processing.

In the field of plastic, polyphenylene ether resins are known as thermoplastic engineering plastics that endure high temperature and have excellent physical properties, such as low dielectric constant, low dissipation factor, high glass transition temperature, low water absorption, good resistance to high temperature and high electrical insulation, yet it needs to be modified because its poor melt flowability is against acceptable processability.

However, a polyphenylene ether resin having a number-average molecular weight (Mn) greater than 10,000 is less soluble in organic solvents and has high melt viscosity, making it unsuitable for circuit boards. On the other hand, a polyphenylene ether resin having a number-average molecular weight lower than 10,000 has its physical properties all lowered, including dielectric constant, dissipation factor, glass transition temperature and viscosity, to the extent that it fails to meet the need of a circuit board where high frequency, low dielectric constant and low dissipation factor are required.

SUMMARY OF THE INVENTION

In view of this, the present invention discloses a compound material applicable to a high-frequency circuit board. The disclosed compound material contains a specially formulated thermosetting resin mixture, which is diluted by a solvent to a proper viscosity, incorporated into a reinforcement at a temperature of 15-40° C. through the traditional impregnating process to form the compound material, and then cured under 100-150° C. into a tack-free prepreg. Several sheets of the prepreg are then stacked through traditional automated layup processing, and the stacked prepreg sheets are as a whole sandwiched by two sheets of copper foil positioned upmost and bottommost before undergoing a high-temperature pressing process under 170-190° C. after which it is cured into a copper-foil coated substrate or circuit board. Therein, the resin mixture used takes 50-90 wt % of a total weight of the compound material, and contains the following components:

(a) a high-molecular-weight polybutadiene resin, containing more than 70 wt % high-vinyl groups, having a weight-average molecular weight (MW) greater than 100,000 g/mol, and taking 0-15 wt % of a total solid content of the resin mixture;

(b) a low-molecular-weight polybutadiene resin, containing more than 70 wt % high-vinyl groups, having a weight-average molecular weight (MW) ranging between 1,000 and 10,000 g/mol, and taking 10-40 wt % of the total solid content of the resin mixture;

(c) a modified thermosetting polyphenylene ether resin, having a weight-average molecular weight (MW) ranging between 1,000 and 5,000 g/mol, taking 5-35 wt % of the total solid content of the resin mixture, and being a thermosetting polyphenylene ether resin whose two terminals are modified with hydroxyl, methacrylate, vinyl, styryl, amino or epoxy groups;

(d) an inorganic powder, taking 0.1-50 wt % of the total solid content of the resin mixture;

(e) a flame retardant, taking 10-35 wt % of the total solid content of the resin mixture;

(f) a cross-linking agent, taking 2-10 wt % of the total solid content of the resin mixture;

(g) a binding promoter, taking 1-10 wt % of the total solid content of the resin mixture; and (h) a curing initiator, taking 0.1-3 wt % of the total solid content of the resin mixture;

wherein, a total content of (a) through (c) takes 30-60 wt % of the total solid content of the resin mixture.

The present invention provides a low-molecular-weight polyphenylene ether resin modified with hydroxyl, methacrylate, vinyl, styryl, amino or epoxy groups, so it can have a grafting and cross-linking reaction with the foregoing polybutadiene resin (e.g., 1,2-polybutadiene) and thereby produce a novel thermosetting polybutadiene copolymer resin that contains polyphenyl ether and facilitates improving traditional compositions and manufacturing methods of circuit boards where pure polybutadiene is too tacky to have acceptable processability, polyphenylene ether (PPE) resin is less soluble and a plasticizer is needed to be added. The used resin mixture, because it contains the high-molecular-weight polybutadiene resin having a large amount of vinyl groups, can sufficiently support the cross-linking reaction when getting cured and enhance the cross-linking density. The low-molecular-weight polybutadiene resin in the resin mixture adjusts the viscosity of the varnish, so that the resultant prepreg and the resultant copper-foil coated substrate or circuit board are excellent in resisting high temperature, soldering and high heat and have high glass transition temperature (Tg).

With the specially formulated formula, the used resin mixture allows a reinforcement to be pre-impregnated at the ambient temperature into the compound material, which is then baked into tack-free prepreg, and particularly processed into copper-foil coated substrates or circuit boards through automated laminating and pressing. The copper-foil coated substrates or circuit boards such made is applicable to high-frequency operation with the operational frequency as high as 1 GHz, and has excellent electrical properties, including a low dielectric constant (i.e., Dk less than 3.2), a low dissipation factor (i.e. Df less than 0.005) and low moisture absorption.

The resultant copper cladded laminates or circuit boards can be made through a pressing process under a lower temperature, such as 170-190° C., which is more advantage in terms of cost as compared with the traditional high-temperature pressing process where a temperature higher than 200° C. is required.

The resultant copper cladded laminates or circuit boards are applicable to high-frequency products whose operational frequencies are up to 1 GHz, such as high-power amplifiers, satellite frequency demultipliers, mobile phone base stations, automobile bump-shielded systems, GPS (Global Position System) products and other applications where high frequency, high power, low signal loss and low noise are required.

DETAILED DESCRIPTION OF THE INVENTION

The present invention provides a compound material. The compound material is made by impregnating a reinforcement with a resin mixture at the ambient temperature ranging between 15° C. and 40° C. The impregnated reinforcement is then cured through a baking process under 100-150° C., so as to form a tack-free prepreg.

The prepreg of the present invention has excellent mechanical properties and electrical properties, including applicability to high-frequency applications, low dielectric constant, low dissipation factor, high thermal stability, high glass transition temperature and low moisture absorption. Particularly, the compound material allows automated layup processing for high-frequency copper cladded laminate.

The copper cladded laminate of the present invention is applicable to production of high-frequency circuit boards using continuous automated manufacture where, a process including, for example, staking three or more sheets of the prepreg, sandwiching the stacked prepreg sheets as a whole with two sheets of copper foil each of a thickness of 35 μm positioned upmost and bottommost, maintaining at 25 kg/cm² and 85° C. for 20 minutes, heating to 170-190° C. with a heating rate of 5° C./min, maintaining at 120 minutes, and then naturally cooling to 130° C., so as to obtain a copper cladded laminate having a thickness more than 0.8 mm.

The compound material of the present invention is composed of the reinforcement 10-50 wt % and the resin mixture for impregnation 50-90 wt %. Therein, the reinforcement is selected from the group consisting of non-woven fiberglass cloth, non-woven liquid-crystalline polymer fiber, synthetic fiber cloth, carbon fiber cloth, polypropylene (PP) cloth, polytetrafluoroethene (PTFE) cloth and non-woven cloth.

In the case using fiberglass cloth, the used fiberglass cloth may have different levels of thickness according to the requirements of the resultant copper cladded laminate. For this purpose, the series of fiberglass cloth supplied by Nan Ya Plastics Corporation (Taiwan) was considered as providing various specifications as listed below:

| Fabric | Basic Weight (g/m²) | Thickness (mm) | Texture (inch) Wrap | Woof |
|---|---|---|---|---|
| 7628 | 208 | 0.18 | 44 | 33 |
| 2116 | 105 | 0.19 | 60 | 58 |
| 1080 | 48 | 0.055 | 60 | 48 |
| 106 | 24 | 0.04 | 56 | 56 |

The resin mixture in the compound material is composed of (a) a high-molecular-weight polybutadiene resin, (b) a low-molecular-weight polybutadiene resins, (c) a modified thermosetting polyphenylene ether resin, (d) an inorganic powder, (e) a flame retardant, (f) a cross-linking agent, (g) a binding promoter and (h) a curing initiator. The recited components are mixed in the ratios given below:

(a) The high-molecular-weight polybutadiene resin has a weight-average molecular weight (MW) greater than 100,000 g/mol and takes 0-15 wt % of a total solid content of the resin mixture, while containing (1,2-vinyl)vinyl more than 70 wt %, and preferably more than 90 wt %.

With more than 70 wt % of vinyl, the polybutadiene resin is able to provide a large amount of unsaturated vinyl groups for supporting the cross-linking reaction while enhancing the resultant cross-linking density, so as to ensure the prepreg of the present and circuit boards made therefrom with excellent resistance to high heat.

The resin used may be one from RB series or PB series supplied by JSR, Japan, such as RB810, RB820 or RB830, or solid 1,2-addition Polybutadiene resin that contains (1,2-vinyl)vinyl more than 90 wt %.

(b) The low-molecular-weight polybutadiene resin has a weight-average molecular weight (MW) ranging between 1,000 and 10,000 g/mol and takes 10-40 wt % of the total solid content of the resin mixture, while containing (1,2-vinyl)vinyl more than 70 wt %, and more preferably more than 90 wt %.

A suitable low-molecular-weight polybutadiene resin may be Ricon100, Ricon150, Ricon153 or Ricon154 supplied by Sartomer Company, USA, or B1000, B2000 or B3000 supplied by Nippon Soda, Japan.

(c) The modified thermosetting polyphenylene ether resin has a weight-average molecular weight (MW) between 1,000 and 5,000 g/mol and takes 5-35 wt % of the total solid content of the resin mixture while being a thermosetting polyphenylene ether resin whose two terminals are modified with hydroxyl, methacrylate, vinyl, styryl, amino or epoxy groups. A suitable modified thermosetting polyphenylene ether resin may be MX90 (with two terminals modified with hydroxyl groups) or MX9000 (with two terminals modified with methacrylate) supplied by SABIC (Saudi Basic Industry Corporation, Saudi Arabia), or OPE-2St (with two terminals modified with styryl groups), OPE-2EA (with two terminals modified with methacrylate groups) or OPE-2Gly (with two terminals modified with epoxy groups supplied by MGC (Mitsubishi Gas Chemical Company, Inc., Japan).

(d) The inorganic powder takes 0.1-50 wt % of the total solid content of the resin mixture and contains one or more selected from the group consisting of spherical or irregular silica ($SiO_2$), titanium dioxide ($TiO_2$), aluminum hydroxide ($Al(OH)_3$), magnesium hydroxide ($Mg(OH)_2$), calcium carbonate ($CaCO_3$) and fumed silica. The inorganic powder preferably has an average particle size ranging between 0.01 and 20 microns. Therein, fumed silica refers to porous nano-sized silica particles, with an average particle size between 1 and 100 nm, and adds viscosity of the resin mixture. In the case where fumed silica is used, the ratio is preferably at the lower limit so as to allow easy processing.

(e) The flame retardant mainly refers to either a brominated series flame retardant or phosphorus series flame retardant and takes 10-35 wt % of the total solid content of the resin mixture.

A suitable brominated flame series retardant may be Saytex BT 93W (ethylene bistetrabromophthalimide), Saytex 120 (tetradecabromodiphenoxy benzene), Saytex 8010 (Ethane-1,2-bis(pentabromophenyl)) or Saytex 102 (decabromo diphenoxy oxide) supplied by Albemarle Corporation, USA.

A suitable phosphorus series flame retardant may be a phosphate ester flame retardant including triphenyl phosphite (or called TPP), resorcinol bis(diphenyl phosphate) (or called RDP), Bisphenol-A bis(diphenyl phosphate) (or called BPAPP), Bisphenol-A bis(dimethyl phosphate) (or called BBC), CR-733S (phenylenebis(phenylcresolphosphate)) supplied from Daihachi Chemical Industry Co., Ltd., Japan and PX-200 (1,3-phenylenebis(dixylenyl)phosphate) supplied from Daihachi Chemical Industry Co., Ltd., Japan, a phosphazene flame retardant such as SPB-100 manufactured by Otsuka Chemical Co., an ammonium polyphosphate flame retardant, a melamine polyphosphate flame retardant and a melamine cyanurate flame retardant.

(f) The cross-linking agent takes 2-10 wt % of the total solid content of the resin mixture and serves to enhance the cross-linking level of the thermosetting resin. A suitable cross-linking agent may be triallyl cyanurate, triallyl isocyanurate (TRIC), diallyl phthalate, divinylbenzene or 1,2,4-triallyl trimellitate or any combination thereof.

(g) The binding promoter is a metallic coagent or a mercapto-type accelerator or a combination thereof. It takes 1-10 wt % of the total solid content of the resin mixture and serves to enhance the binding strength between the resin and the copper foil. The metallic coagent may be an alkali metal promoter, an alkali earth promoter or a complex compound of zinc element and acrylic acid. A suitable binding promoter may include metallic diacrylate and metallic dimethacrylate (e.g. SR633 or SR708) and metallic monomethacrylate. The mercapto-type accelerator may include dodecyl mercaptan, thioglycerol and 1,3,5-triazine-2,4,6-trithiol (TMT).

(h) The curing initiator takes 0.1-3 wt % of the total solid content of the resin mixture and serves to accelerate the cross-linking reaction. When the resin mixture of the present invention is heated, the initiator is decomposed and forms free radicals, so as to initiate the cross-linked polymerization. Suitable curing initiators may include organic peroxides, tert-butyl cumyl peroxide, dicumyl peroxide (DCP), benzoyl peroxide (BPO), 2,5-dimethyl-2,5-bis(tert-butyl-peroxy)hexane, 2,5-dimethyl-2,5-bis(tert-butyl-peroxy)hexyne, and 1,1-di(tert-butyl-perocidyl)-3,3,5-trimethylcyclohexane.

In addition, the resin mixture of the present invention may be added with a coupling agent for improving the affinity at the interface between the inorganic powder and the resin. The coupling agent may be directly added into the resin mixture. Alternatively, the inorganic powder may be pre-processed with the coupling agent and then used to make the resin mixture of the present invention.

While the effects of the present invention will be illustrated through the Examples and Comparative Examples given below, it is to be understood that the scope of the present invention is not limited to these Examples.

The copper claded laminates made according to these Examples and Comparative Examples were measured in the following respects and by the following methods 1. Glass transition temperature (° C.): measured by Rheometric RSAIII, a dynamic mechanical analyzer (DMA).
2. Water absorption (%): the samples were measured before and after heated under 2 atm pressure at 120° C. for 120 minutes to determine their variation in weight.
3. Resistance to soldering at 288° C. (second): the samples were heated under 2 atm pressure at 120° C. for 120 minutes and soaked into a soldering pot at 288° C. with the time lapsing before the samples delamitated recorded.
4. Copper foil peeling strength (lb/in): the peeling strength between the copper foil and the circuit board was measured.
5. Dielectric constant Dk (1 GHz): HP Agilent E4991A, a dielectric analyzer, was used to measure the samples in dielectric constant Dk at 1 GHz.
6. Dissipation factor Df (1 GHz): HP Agilent E4991A, a dielectric analyzer, was used to measure the samples in dissipation factor Df at 1 GHz.

Example 1

To take 31 parts by weight of RB810 (polybutadiene) (obtained from JSR, Japan), 36 parts by weight of Ricon154 (polybutadiene) (obtained from Sartomer Company, USA), 25 parts by weight of Ricon150 (polybutadiene) (obtained from Sartomer Company, USA) and 42 parts by weight of MX90 modified polyphenyl ether (with two terminals modified with hydroxyl groups, obtained from SABIC, Saudi Arabia) were weighted and well mixed under the ambient temperature with a proper amount of methylbenzene. Then 5.3 parts by weight of SR633 as a binding promoter, and 107.2 parts by weight of silica filler were added successively. Afterward, 96.4 parts by weight of SAYTEX 8010 as the brominated flame retardant, 10.8 parts by weight of TRIC as the cross-linking agent, 4.82 parts by weight of DCP as the curing initiator and 1.61 parts by weight of BPO as the curing initiator were evenly mixed. At the ambient temperature, NanYa fiberglass cloth (NanYa Plastics Corporation, Taiwan, Cloth Model 7628) was impregnated with the foregoing resin liquid, and dried at 110° C. (in an impregnating machine) for several minutes. Four sheets of the prepreg such obtained were stacked between two sheets of 35 μm thick copper foil. The combination was maintained at 25 kg/cm² and 85° C. for 20 minutes, heated to 185° C. with a heating rate of 5° C./min, maintained at the temperature for 120 minutes, and then naturally cooled to 130° C. to obtain a copper claded laminate having a thickness of 0.8 mm.

The copper claded laminate such made was measured for its physical properties, and the measured results were summarized in Table 1.

Example 2

The process described in Example 1 was repeated except that MX9000 modified polyphenyl ether (with two terminals modified with methacrylate groups, obtained from SABIC, Saudi Arabia) was used instead of the polyphenylene ether resin (MX90).

The copper claded laminate such made was measured for its physical properties, and the measured results were summarized in Table 1.

Example 3

The process described in Example 1 was repeated except that OPE-2EA modified polyphenyl ether (with two terminals modified with methacrylate groups, obtained from MGC, Japan) was used instead of the polyphenylene ether resin (MX90).

The copper claded laminate such made was measured for its physical properties, and the measured results were summarized in Table 1.

Example 4

The process described in Example 1 was repeated except that OPE-2Gly modified polyphenyl ether (with two terminals modified with epoxy groups, obtained from MGC, Japan) was used instead of the polyphenylene ether resin (MX90).

The copper claded laminate such made was measured for its physical properties, and the measured results were summarized in Table 1.

Example 5

The process described in Example 1 was repeated except that OPE-2St modified polyphenyl ether (with two terminals modified with styryl groups, obtained from MGC, Japan) was used instead of the polyphenylene ether resin (MX90).

The copper claded laminate such made was measured for its physical properties, and the measured results were summarized in Table 1.

Example 6

The process described in Example 5 was repeated except that the binding promoter was added with 1.45 parts by weight of TMT.

The copper claded laminate such made was measured for its physical properties, and the measured results were summarized in Table 1.

Example 7

The process described in Example 5 was repeated except that the used fiberglass cloth for making prepreg was Model 106 (supplied by Nan Ya Plastics Corporation, Taiwan).

The copper claded laminate such made was measured for its physical properties, and the measured results were summarized in Table 1.

Example 8

The process described in Example 5 was repeated except that Ricon100 (polybutadiene) was used instead of the Ricon154 (polybutadiene).

The copper claded laminate such made was measured for its physical properties, and the measured results were summarized in Table 1.

Example 9

The process described in Example 5 was repeated except that Ricon100 (polybutadiene) was used instead of the RB810 (polybutadiene) and that BT-93W (brominated flame retardant) was used instead of the SAYTEX 8010 (brominated flame retardant).

The copper claded laminate such made was measured for its physical properties, and the measured results were summarized in Table 1.

Example 10

The process described in Example 5 was repeated except that SPB-100 (phosphazene flame retardant) was used instead of the SAYTEX 8010 (brominated flame retardant).

The copper claded laminate such made was measured for its physical properties, and the measured results were summarized in Table 1.

Comparative Example 1

To take 31 parts by weight of RB810 (polybutadiene) (obtained from JSR, Japan), 56 parts by weight of Ricon154 (polybutadiene) (obtained from Sartomer Company, USA) and 47 parts by weight of Ricon150 (polybutadiene) (obtained from Sartomer Company, USA) were weighted and well mixed under the ambient temperature with a proper amount of methylbenzene. Then 5.3 parts by weight of SR633 as a binding promoter, and 107.2 parts by weight of silica filler were added successively. Afterward, 97 parts by weight of SAYTEX 8010 as the brominated flame retardant, 9.9 parts by weight of TAIC as the cross-linking agent, 4.82 parts by weight of DCP as the curing initiator and 1.61 parts by weight of BPO as the curing initiator were evenly mixed. At the ambient temperature, Nan Ya fiberglass cloth (Nan Ya Plastics Corporation, Taiwan, Cloth Model 106) was impregnated with the foregoing resin liquid, and dried at 110° C. (in an impregnating machine) for several minutes. Four sheets of the prepreg such obtained were stacked between two sheets of 35 µm thick copper foil. The combination was maintained at 25 kg/cm$^2$ and 85° C. for 20 minutes, heated to 185° C. with a heating rate of 5° C./min, maintained at the temperature for 120 minutes, and then naturally cooled to 130° C. to obtain a copper claded laminate having a thickness of 0.8 mm.

The obtained prepreg was tacky, not stackable and unsuitable for continuous manufacture. The laminated board was relatively soft, with low glass transition temperature and low rigidity.

Comparative Example 2

A polyphenylene ether resin (PPE, weight-average molecular weight (MW)=15,000 g/mol) was weighted for 134 parts by weight and added into a proper amount of methylbenzene before heated to melt. Then 5.3 parts by weight of SR633 as a binding assistant, and 102.3 parts by weight of silica filler were added successively. Afterward, 92 parts by weight of SAYTEX 8010 as the brominated flame retardant, 10.8 parts by weight of TAIC as the cross-linking agent, 4.65 parts by weight of DCP as the curing initiator and 1.56 parts by weight of BPO as the curing initiator were evenly mixed. At the ambient temperature, Nan Ya fiberglass cloth (Nan Ya Plastics Corporation, Taiwan, Cloth Model 7628) was impregnated with the foregoing resin liquid, and dried at 110° C. (in an impregnating machine) for several minutes. Four sheets of the prepreg such obtained were stacked between two sheets of 35 µm thick copper foil. The combination was maintained at 25 kg/cm² and 85° C. for 20 minutes, heated to 185° C. with a heating rate of 5° C./min, maintained at the temperature for 120 minutes, and then naturally cooled to 130° C. to obtain a copper claded laminate having a thickness of 0.8 mm.

The copper-foil coated substrate such made was measured for its physical properties, and the measured results were summarized in Table 1.

Comparative Example 3

The process described in Example 5 was repeated except that no binding promoter was used.

The copper claded laminate such made was measured for its physical properties, and the measured results were summarized in Table 1.

TABLE 1

Formulae and Physical Properties of Prepreg and Substrates of Different Examples and Comparative Examples

| Composition (parts by weight) | | | Example 1 | Example 2 | Example 3 | Example 4 | Example 5 |
|---|---|---|---|---|---|---|---|
| Formula | Poly-butadiene Resin | RB810 | 31 | 31 | 31 | 31 | 31 |
| | | Ricon154 | 36 | 36 | 36 | 36 | 36 |
| | | Ricon150 | 25 | 25 | 25 | 25 | 25 |
| | | Ricon100 | — | — | — | — | — |
| | Polyphenyl Ether Resin | MX90 | 42 | — | — | — | — |
| | | MX9000 | — | 42 | — | — | — |
| | | OPE-2St | — | — | — | — | 42 |
| | | OPE-2EA | — | — | 42 | — | — |
| | | OPE-2Gly | — | — | — | 42 | — |
| | | PPE (MW = 15,000 g/mol) | — | — | — | — | — |
| | Cross-Linking Agent | TAIC | 10.8 | 10.8 | 10.8 | 10.8 | 10.8 |
| | Flame Retardant | SAYTEX 8010 | 96.4 | 96.4 | 96.4 | 96.4 | 96.4 |
| | | BT-93W | — | — | — | — | — |
| | | SPB-100 | — | — | — | — | — |
| | Filler | SiO2 | 107.2 | 107.2 | 107.2 | 107.2 | 107.2 |
| | Binding Promoter | SR633 | 5.3 | 5.3 | 5.3 | 5.3 | 5.3 |
| | | TMT | — | — | — | — | — |
| | Initiator | DCP | 4.82 | 4.82 | 4.82 | 4.82 | 4.82 |
| | | BPO | 1.61 | 1.61 | 1.61 | 1.61 | 1.61 |
| Prepreg | | Fiberglass Cloth | 7628 | 7628 | 7628 | 7628 | 7628 |
| | | Resin Content | 56% | 56% | 56% | 56% | 56% |
| | | Tacky | No | No | No | No | No |
| Glass Transition Temperature (° C.) (DMA¹) | | | 201.3 | 202.4 | 201.4 | 203.1 | 207.5 |
| Water absorption (%)² | | | 0.020 | 0.015 | 0.012 | 0.014 | 0.010 |
| Resistance to soldering at 288° C. (sec.)³ | | | >600 | >600 | >600 | >600 | >600 |
| Copper foil's peeling strength (lb/in) | | | 4.32 | 4.36 | 4.58 | 4.68 | 4.28 |
| Resin substrate⁴ | Dielectric Constant Dk (1 GHz) | | 2.81 | 2.79 | 2.69 | 2.75 | 2.76 |
| | Dissipation Factor Df (1 GHz) | | 0.004 | 0.003 | 0.003 | 0.004 | 0.002 |
| Circuit Board⁵ | Dielectric Constant Dk (1 GHz) | | 3.11 | 3.18 | 3.17 | 3.20 | 3.05 |
| | Dissipation Factor Df (1 GHz) | | 0.004 | 0.003 | 0.003 | 0.004 | 0.002 |
| Flame resistance (UL-94) | | | V-0 | V-0 | V-0 | V-0 | V-0 |

| Composition (parts by weight) | | | Example 6 | Example 7 | Example 8 | Example 9 | Example 10 |
|---|---|---|---|---|---|---|---|
| Formula | Poly-butadiene Resin | RB810 | 31 | 31 | 31 | — | 31 |
| | | Ricon154 | 36 | 36 | — | 36 | 36 |
| | | Ricon150 | 25 | 25 | 25 | 25 | 25 |
| | | Ricon100 | — | — | 36 | 31 | — |
| | Polyphenyl Ether Resin | MX90 | — | — | — | — | — |
| | | MX9000 | — | — | — | — | — |
| | | OPE-2St | 42 | 42 | 42 | 42 | 42 |
| | | OPE-2EA | — | — | — | — | — |
| | | OPE-2Gly | — | — | — | — | — |
| | | PPE (MW = 15,000 g/mol) | — | — | — | — | — |

TABLE 1-continued

Formulae and Physical Properties of Prepreg and Substrates of Different Examples and Comparative Examples

| | | | | | | | |
|---|---|---|---|---|---|---|---|
| Cross-Linking Agent | TAIC | 10.8 | 10.8 | 10.8 | 10.8 | 10.8 | |
| Flame Retardant | SAYTEX 8010 | 96.4 | 96.4 | 96.4 | — | — | |
| | BT-93W | — | — | — | 96.4 | — | |
| | SPB-100 | — | — | — | — | 96.4 | |
| Filler | SiO2 | 107.2 | 107.2 | 107.2 | 107.2 | 107.2 | |
| Binding Promoter | SR633 | 5.3 | 5.3 | 5.3 | 5.3 | 5.3 | |
| | TMT | 1.45 | — | — | — | — | |
| Initiator | DCP | 4.82 | 4.82 | 4.82 | 4.82 | 4.82 | |
| | BPO | 1.61 | 1.61 | 1.61 | 1.61 | 1.61 | |
| Prepreg | Fiberglass Cloth | 7628 | 106 | 7628 | 7628 | 7628 | |
| | Resin Content | 56% | 80% | 56% | 56% | 56% | |
| | Tacky | No | No | No | No | No | |
| Glass Transition Temperature (° C.) (DMA[1]) | | 205.3 | 206.4 | 201.5 | 206.1 | 201.7 | |
| Water absorption (%)[2] | | 0.010 | 0.015 | 0.010 | 0.010 | 0.018 | |
| Resistance to soldering at 288° C. (sec.)[3] | | >600 | >600 | >600 | >600 | >600 | |
| Copper foil's peeling strength (lb/in) | | 5.63 | 4.35 | 4.32 | 4.65 | 4.33 | |
| Resin substrate[4] | Dielectric Constant Dk (1 GHz) | 2.75 | 2.37 | 2.75 | 2.64 | 2.83 | |
| | Dissipation Factor Df (1 GHz) | 0.002 | 0.002 | 0.002 | 0.002 | 0.004 | |
| Circuit Board[5] | Dielectric Constant Dk (1 GHz) | 3.04 | 2.88 | 3.04 | 3.07 | 3.14 | |
| | Dissipation Factor Df (1 GHz) | 0.002 | 0.002 | 0.002 | 0.002 | 0.004 | |
| Flame resistance (UL-94) | | V-0 | V-0 | V-0 | V-0 | V-0 | |

| | | | Comparative Example | | |
|---|---|---|---|---|---|
| Composition (parts by weight) | | | 1 | 2 | 3 |
| Formula | Polybutadiene Resin | RB810 | 31 | — | 31 |
| | | Ricon154 | 56 | — | 36 |
| | | Ricon150 | 47 | — | 25 |
| | | Ricon100 | — | — | — |
| | Polyphenyl Ether Resin | MX90 | — | — | — |
| | | MX9000 | — | — | — |
| | | OPE-2St | — | — | 42 |
| | | OPE-2EA | — | — | — |
| | | OPE-2Gly | — | — | — |
| | | PPE (MW = 15,000 g/mol) | — | 134 | — |
| | Cross-Linking Agent | TAIC | 9.9 | 10.8 | 10.8 |
| | Flame Retardant | SAYTEX 8010 | 97 | 92 | 96.4 |
| | | BT-93W | — | — | — |
| | | SPB-100 | — | — | — |
| | Filler | SiO2 | 107.2 | 102.3 | 107.2 |
| | Binding Promoter | SR633 | 5.3 | 5.3 | — |
| | | TMT | — | — | — |
| | Initiator | DCP | 4.82 | 4.65 | 4.82 |
| | | BPO | 1.61 | 1.56 | 1.61 |
| Prepreg | Fiberglass Cloth | | 106 | 7628 | 7628 |
| | Resin Content | | 80% | 56% | 56% |
| | Tacky | | Yes | No | No |
| Glass Transition Temperature (° C.) (DMA[1]) | | | 206.4 | 210.1 | 205.2 |
| Water absorption (%)[2] | | | 0.015 | 0.35 | 0.01 |
| Resistance to soldering at 288° C. (sec.)[3] | | | 2 | 380 | >600 |
| Copper foil's peeling strength (lb/in) | | | 4.35 | 6.37 | 3.80 |
| Resin substrate[4] | Dielectric Constant Dk (1 GHz) | | 2.74 | 3.09 | 2.76 |

TABLE 1-continued

Formulae and Physical Properties of Prepreg and Substrates of Different Examples and Comparative Examples

| | | | | |
|---|---|---|---|---|
| | Dissipation Factor Df (1 GHz) | 0.002 | 0.004 | 0.002 |
| Circuit Board[5] | Dielectric Constant Dk (1 GHz) | 3.03 | 3.41 | 3.04 |
| | Dissipation Factor Df (1 GHz) | 0.002 | 0.004 | 0.002 |
| Flame resistance (UL-94) | | V-0 | V-0 | V-0 |

Note:
[1] The values were measured by a dynamic mechanical analyzer (DMA).
[2] The samples were measured before and after heated under 2 atm pressure at 120° C. for 120 minutes.
[3] The samples were heated under 2 atm pressure at 120° C. for 120 minutes and soaked into a soldering pot at 288° C. with the time lapsing before the samples delamitated recorded.
[4] A resin substrate refers to a cured composition without the fiberglass cloth.
[5] A circuit board refers to a cured composition with the fiberglass cloth.

Results

By comparing the results shown in Table 1, the following conclusion can be obtained:

1. The formulas of the resin mixtures of Examples 1-10 contained polybutadiene resins added with modified polyphenylene ether resins, and the resultant prepreg was tack-free with glass transition temperature after cured more than 200° C., resistance to soldering at 288° C. longer than 600 seconds, and copper foil's peeling strength more than 4 lb/in, all being excellent.

The resin mixture of Comparative Example 1 contained no polyphenylene ether resin, so its resistance to soldering at 288° C. was poor, only 2 seconds.

2. The prepreg made according to Examples 1-10 were tack-free and thus suitable for automated manufacture.

The prepreg made in Comparative Example 1 was semi-cured (B stage) and tacky, so was less stackable and unsuitable for automated manufacture.

The prepreg made in Comparative Example 2 was tack-free, but needed to be heated and melted for preparing the varnish of the resin mixture, thus complicating the manufacturing process.

3. By comparing with the formula of the resin mixture of Examples 5, the formula of Example 6 additionally had the mercaptan promoter that was proven useful to improve the peeling strength between the copper foil and the substrate of the copper cladded laminate by more than 1 lb/in.

The resin mixture of Comparative Example 3 formulated without the binding promoters SR 633 and TMT caused the peeling strength between the copper foil and the substrate of the resultant copper foil significantly lower than those of the other Examples.

4. The copper cladded laminates or circuit boards made from the resin mixtures of the formulas described in Examples 1-10 were formed under a hot-pressing condition of 185° C., without using high-temperature pressing using a temperature higher than 200° C. Theses substrates or circuit boards, when being applied to operation of high frequency up to 1 GHz, exhibited better electrical properties, and possessed lower dielectric constant, lower dissipation factor and lower moisture absorption.

Particularly, the circuit board made from the copper cladded laminate of Example 7 where No. 106 fiberglass cloth was used, when being applied to operation of high frequency up to 1 GHz, showed a dielectric constant Dk=2.88, much lower than 3.2, and a low dissipation factor Df=0.002, also much lower than 0.005.

What is claimed is:

1. A compound material applicable to a high-frequency circuit board, the compound material having a property of undergoing a hot-pressing process under 170-190° C. as well as having a high glass transition temperature after cured more than 200° C. and consisting of 10-50 wt % of a reinforcement and 50-90 wt % of a resin mixture, wherein the reinforcement is selected from the group consisting of non-woven fiberglass cloth, non-woven liquid-crystalline polymer fiber, synthetic fiber cloth, carbon fiber cloth, PP cloth, PTFE cloth and non-woven cloth, and wherein the resin mixture consisting of:

(a) a high-molecular-weight polybutadiene resin, containing more than 70 wt % high-vinyl groups, having a weight-average molecular weight (MW) greater than 100,000 g/mol, and taking in an amount greater than zero and equal to or less than 15 wt % of a total solid content of the resin mixture;

(b) a low-molecular-weight polybutadiene resin, containing more than 70 wt % high-vinyl groups, having a weight-average molecular weight (MW) ranging between 1,000 and 10,000 g/mol, and taking 10-40 wt % of the total solid content of the resin mixture;

(c) a modified thermosetting polyphenylene ether resin, having a weight-average molecular weight (MW) ranging between 1,000 and 5,000 g/mol, taking 5-35 wt % of the total solid content of the resin mixture, and being a thermosetting polyphenylene ether resin whose two terminals are modified with hydroxyl, methacrylate, vinyl, styryl, amino or epoxy groups;

(d) an inorganic powder, taking 0.1-50 wt % of the total solid content of the resin mixture;

(e) a flame retardant, taking 10-35 wt % of the total solid content of the resin mixture;

(f) a cross-linking agent serves to enhance the cross-linking level of the thermosetting resin, taking 2-10 wt % of the total solid content of the resin mixture; wherein the cross-linking agent is one or more selected from the group consisting of triallyl cyanurate, triallylisocyanurate (TAIC), diallyl phthalate, divinylbenzene and 1,2,4-triallyltrimellitate;

(g) a binding promoter serves to enhance the binding strength between the resin and a copper foil covered thereon, taking 1-10 wt % of the total solid content of the resin mixture, wherein the binding promoter is a metal coagent, a mercapto-type-accelerator or a combination thereof; and (h) a curing initiator; taking 0.1-3 wt % of the total solid content of the resin mixture; wherein, a total content of (a) through (c) takes 30-60 wt % of the total solid content of the resin mixture.

2. The compound material of claim 1, wherein the inorganic particulate filler is one or more selected from the group consisting of spherical or irregular silica, titanium dioxide, aluminum hydroxide, magnesium hydroxide, calcium carbonate, talc and fumed silica.

3. The compound material of claim 1, wherein the flame retardant is one or more selected from the group consisting of ethylene bistetrabromophthalimide, tetradecabromodiphenoxy benzene, ethane-1,2-bis(pentabromophenyl), decabromo diphenoxy oxide, phosphazene, ammonium polyphosphate, melamine polyphosphate and melamine cyanurate.

4. The compound material of claim 1, wherein the metal coagent is selected from the group consisting of alkali metal promoters, alkali earth promoters and a complex compound produced by reaction between zinc element and acrylic acid.

5. The compound material of claim 1, wherein the mercapto-type accelerator is selected from the group consisting of dodecyl mercaptan, thioglycerol and 1,3,5-triazine-2,4,6-trithiol (TMT).

6. The compound material of claim 1, wherein the curing initiator is selected from the group consisting of radical curing initiators including organic peroxides, including tert-butyl cumyl peroxides, dicumyl peroxide (DCP), benzoyl peroxide (BPO), 2,5-dimethyl-2,5-bis(tert-butyl-peroxy) hexane, 2,5-dimethyl-2,5-bis(tert-butyl-peroxy) hexyne, and 1,1-di(tert-butyl-perocidyl)-3,3,5-trimethylcyclohexane, with an amount of use ranging between 0.1 and 3 wt %.

7. A high-frequency copper claded laminate applicable to a use where an operational frequency is at least 1 GHz, the substrate comprising the compound material of claim 1, and having a dielectric constant (Dk) less than 3.2 and a dissipation factor (Df) less than 0.005.

8. The compound material of claim 1, wherein the high-molecular-weight polybutadiene resin is present in an amount from 8.57 wt % and equal to or less than 15 wt % of a total solid content of the resin mixture.

9. The compound material of claim 1, wherein the high-molecular-weight polybutadiene resin is present in an amount 8.57 wt % of the total solid content of the resin mixture.

10. The compound material of claim 1, wherein the high-molecular-weight polybutadiene resin is present in an amount 8.61 wt % of the total solid content of the resin mixture.

* * * * *